US007117182B2

(12) United States Patent
Chess et al.

(10) Patent No.: US 7,117,182 B2
(45) Date of Patent: Oct. 3, 2006

(54) METHOD FOR DISAGGREGATING CUSTOMER DATA IN ONLINE TRANSACTIONS TO PRESERVE PRIVACY

(75) Inventors: David M. Chess, Mohegan Lake, NY (US); Ian N. Whalley, Pawling, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/041,391

(22) Filed: Jan. 8, 2002

(65) Prior Publication Data

US 2003/0130951 A1    Jul. 10, 2003

(51) Int. Cl.
*G06F 17/60* (2006.01)
(52) U.S. Cl. .............................. 705/74; 705/64; 705/75
(58) Field of Classification Search .................... 705/1, 705/26, 35, 50, 51, 64, 74, 75
See application file for complete search history.

(56) References Cited

U.S. PATENT DOCUMENTS

| | | | | |
|---|---|---|---|---|
| 5,855,008 A | * | 12/1998 | Goldhaber et al. | 705/14 |
| 6,000,832 A | * | 12/1999 | Franklin et al. | 700/232 |
| 6,006,200 A | * | 12/1999 | Boies et al. | 705/26 |
| 6,163,771 A | * | 12/2000 | Walker et al. | 705/18 |
| 6,422,462 B1 | * | 7/2002 | Cohen | 235/381 |
| 6,598,027 B1 | * | 7/2003 | Breen et al. | 705/26 |
| 6,938,022 B1 | * | 8/2005 | Singhal | 705/74 |

FOREIGN PATENT DOCUMENTS

DE              4022268 A1 *  1/1992

OTHER PUBLICATIONS

Peter E. Dyson, "Toward electronic money: some Internet experiments", Seybold Report on Desktop Publishing, v9, n10, p. 3(9), Jun. 10, 1995.*
"Privacy Payments-Shop Online with Greater Peave of Mind: A New Level of Security from American Express", 26.americanexpress.com.
"Your Guide to the CSA's Privacy Code", Canadian Standards Association (CSA) Internation, Mar. 1996.
"Platform for Privacy Preferences (P3P) Project", w3.org.

* cited by examiner

*Primary Examiner*—Calvin L. Hewitt, II
(74) *Attorney, Agent, or Firm*—Ohlandt, Greeley, Ruggiero & Perle, L.L.P.; E. Dwayne Nelson

(57) ABSTRACT

A method for carrying out multi-party transactions in which at least one party or user has information which he considers private, the method comprising: a first determining step, in which it is determined which parties will take part in the transaction; a second determining step, in which it is determined, for each party taking part in the transaction, what information about the user that party requires in order to complete the corresponding part of the transaction; a selecting step, which may occur before or after the determining steps, in which one or more nonces, GUIDs, or other tokens are selected, to represent the user in the course of the transaction; a providing step, in which each party determined in the first determining step is provided with information comprising the corresponding information about the user determined in the second determining step, and one or more of the nonces, GUIDs, or other tokens selected in the selecting step; an execution step, in which the parties to the transaction complete the transaction, using the information about the user that they have been given, and the one or more nonces, GUIDs, or other tokens, to determine and communicate the details of the fulfillment while minimizing the amount of unneeded private information that is transmitted or otherwise exposed.

23 Claims, 3 Drawing Sheets

METHOD FOR DISAGGREGATING CUSTOMER DATA IN ONLINE TRANSACTIONS TO PRESERVE PRIVACY

FIELD OF THE INVENTION

This invention pertains to the field of customer data in on-line transactions and particularly to the need to protect the privacy of such data.

BACKGROUND OF THE INVENTION

In order to transact business or conduct any other interaction, it is necessary for the parties involved to exchange certain information about themselves. But when this information is private or otherwise valuable, there is a risk that the information provided will be revealed in undesirable ways. Breaches of computer security at online commerce sites have resulted in the compromise of sensitive customer data on numerous occasions; loose administrative procedures, corporate acquisitions, and the sale of customer databases have had the same result at least as often. Because of these risks, it is desirable to minimize the amount of information that is exchanged, and in particular to avoid providing private information to any party that does not in fact need to have it.

In carrying out multi-party transactions, it is common for information to be passed to a party that does not actually use the information itself, but merely passes it on to a third party for their use. For instance, in a retail e-commerce transaction where an individual purchases a book at a Web site, the individual will usually provide a mailing address to the Web site, even though the Web site does not use the address itself; it merely passes it along to the shipping company. The present invention reduces the amount of such unnecessary provision of information.

In the recent past, considerable attention has been paid to protecting private information, particularly in on-line systems such as the World Wide Web. The Platform for Privacy Preferences Project ("http://www.w3.org/P3P/") seeks to standardize the representation of Web site privacy policies, and the privacy desires of users, in order to give users more knowledge of and control over the information that they give out. Standards of practice such as the U.S. Code of Fair Information Practices (Secretary's Advisory Comm. on Automated Personal Data Systems, Records, Computers, and the Rights of Citizens, U.S. Dept. of Health, Education and Welfare, July 1973), the Canadian Standards Association's Model Privacy Code ("http://www.media-awareness.ca/eng/issues/priv/resource/csa.htm") and similar practices legally required within the European Community attempt to define, through standards or legislation, the measures that parties which are in possession of private information must take to reduce the likelihood that the information will be misused. The American Express "Private Payments" service ("http://www.americanexpress.com/privatepayments") provides a temporary limited-life credit-card number, to reduce the time-window during which the information could be abused. Internet RFC 2778 ("http://www.ietf.org/rfc/rfc2778.txt") provides for methods whereby the user of an instant messaging system may conceal or otherwise obscure certain private information (in particular, presence information) from other users. None of these ideas address the specific issue of unnecessary information exposure in multi-party transactions.

The present invention solves the problem of providing unnecessary information to parties in a multi-party transaction by providing each party only that private user information that the party actually requires in order to carry out its role in the transaction, while at the same time providing enough information to allow the various parties to the transaction to make the necessary correlations between their views of the user.

For instance, in the simple case of buying a book at a Web site, the user would (in one embodiment) first obtain from the bookseller contact information for the shipper and the credit-card fulfillment service the bookseller wishes to use. Next, the user would obtain (in a manner that will be specified below) a unique identifier. The user would provide the unique identifier and a list of the desired books to the book-selling site. The user would next provide the unique identifier and the proper mailing address to the shipper, and the unique identifier and the appropriate credit-card number to the credit-card site. The book-selling site would send a request to the credit-card site, giving only the amount of the transaction and the unique identifier; the credit-card site would find the credit-card number based on the previous message from the user, debit the account, and return an acknowledgment to the book-seller. The book-selling site would then package up the book and request that the shipper ship it to the address corresponding to the unique identifier (that address is known to the shipper from the previous message from the user, but unknown to the book-seller). The user has now obtained and paid for a book, without revealing to the bookseller either the shipping address or the credit-card number. The user has exposed less private data to fewer parties, and the parties have less private data that they must safeguard. The customer may be willing to pay a premium, or at any rate may have increased feelings of loyalty and comfort toward the parties involved, because of these improvements to the transaction.

Note that in the current, known system, where many vendors possess databases containing significant amounts of personal information about a multitude of users and customers, compromise of any one of these vendors exposes all that personal information. An advantage of the present invention is that, when each vendor possesses only that information that is actually needed for one part of a transaction, the full set of personal information is exposed only if all the vendors involved in some transaction are compromised simultaneously. This drastically reduces the likelihood of the event.

Vendors typically desire to provide many services in addition to simple selling: discounts, frequent-buyer programs, recommendation services and so on are important value-added services in the modern market. The use of this invention does not prevent vendors from providing these services; it does not "blind" vendors to necessary information about customers, it only relieves them of the burden of receiving private customer information that they do not in fact need.

SUMMARY OF THE INVENTION

Briefly stated, to obviate the serious inroads that can be made on privacy in online transactions, the present invention resides in the provision of a method for carrying out multi-party transactions in which at least one party or user has information which he considers private, the method comprising: a first determining step, in which it is determined which parties will take part in the transaction; a second determining step, in which it is determined, for each party taking part in the transaction, what information about the user that party requires in order to complete the corresponding part of the transaction; a selecting step, which may occur before or after the determining steps, in which one or more nonces, GUIDs, or other tokens are selected, to represent the user in the course of the transaction; a providing step, in which each party determined in the first determining step is provided with information comprising the corresponding information about the user determined in the second determining step, and one or more of the nonces, GUIDs, or other tokens selected in the selecting step; an execution step, in which the parties to the transaction complete the transaction, using the information about the user that they have been given, and the one or more nonces, GUIDs, or other tokens, to determine and communicate the details of the fulfillment while minimizing the amount of unneeded private information that is transmitted or otherwise exposed.

There are many possible detailed embodiments of this invention. For example, the construction of unique identifiers and the routing of private information and identifiers to the relevant parties might be carried out (for a fee or other consideration) by an intermediary "private information service". In another embodiment, these activities would be carried out automatically by the user's own client software (a Web browser, plug-in, or other program). In still another embodiment, the user would provide at least some of the necessary information manually, for example by filling out registration forms.

In some embodiments of this invention, multiple unique identifiers are generated or otherwise selected, and a means is provided for mapping one identifier onto another. For instance, in the example above, the bookseller and the shipper might be given different unique identifiers; say IdA for the bookseller, and IdB for the shipper. A third-party mapping service would be told that IdA corresponds to IdB, the bookseller would be given IdA and contact information for the mapping service, and the shipper would be told that IdB corresponds to a certain shipping address. To cause the books to be shipped, the bookseller would provide to the mapping service data including: the identifier IdA, contact information for the shipper, and other information sufficient for the shipper to find the package to be shipped. The mapping service would then replace IdA with IdB and provide the result (IdB and the information about the package) to the shipper. Now even if both the bookseller and the shipper are compromised, an attacker would not be able to correlate the name of the book (known only to the bookseller) and the delivery address (known only to the shipper), since they are stored under different unique identifiers. (IdA at the book seller, IdB at the shipper.)

In the case that the construction of unique identifiers and the routing of private information is carried out by an intermediary private information service, the identities of some of the parties involved in the transaction might be concealed even from the private information service, in yet another embodiment of this invention. In this case, the initially-contacted party (the book-seller, in the example above) would generate or otherwise select another set of unique identifiers, one for each other party to the transaction (the shipper and credit-card company in the example). It would then provide those identifiers, and a description of the type of information needed by each one, to the private information service; and it would provide the corresponding identifier and the electronic address of the private information service to each other party. To obtain the needed private information about the user (the shipping address for the shipper, the credit card number for the credit-card provider), each party would contact the private information service anonymously, using the unique identifier selected by the initially-contacted party to prove their right to obtain the corresponding private information without revealing their identities.

In another embodiment of this invention, two or more of the "parties" to the transaction may in fact be different parts of the same business or other entity. When some party to a transaction does need to have multiple pieces of private information about some user, the danger that that information will be exposed due to malice or error can be reduced by dividing the information into its component parts, and keeping different parts in different (logical or physical) databases on different (logical or physical) systems. In this case, the construction of unique identifiers and the routing of private information may occur entirely within a single business or other entity, which in this case is treating two or more of its own internal functions as separate parties to the transaction.

Other aspects of this invention may be embodied in different ways. The unique identifiers used to correlate the parts of a transaction may be generated by any of various methods known to the art, including those used for generating cryptographic "nonces", "GUIDs" (Globally Unique Identifiers), and similar data items. A new token may be generated for each transaction, or tokens may be re-used for a certain period of time, a certain number of transactions, until manually re-cycled by the user, or any of a number of other embodiments that will be obvious to those skilled in the art. This invention can be used across a variety of different networks and communication methods. Where this discussion mentions "providing", "sending" or "transmitting" information to a party, the information could be made available in numerous ways, including ordinary transmission, schemes in which the "receiving" party is notified that the information is available and actively connects to the "sending" party to obtain it, and so on; these details do not alter the basic teaching of the invention.

In the implementation of the methods of the present invention, a computer-readable medium, per se well-known, stores the computer program instructions that serve to direct the execution of the method steps The foregoing and still further objects and advantages of the present invention will be more apparent from the following detailed explanation of the preferred embodiments of the invention in connection with the accompanying drawing.

DESCRIPTION OF PREFERRED EMBODIMENT

Figure 1:
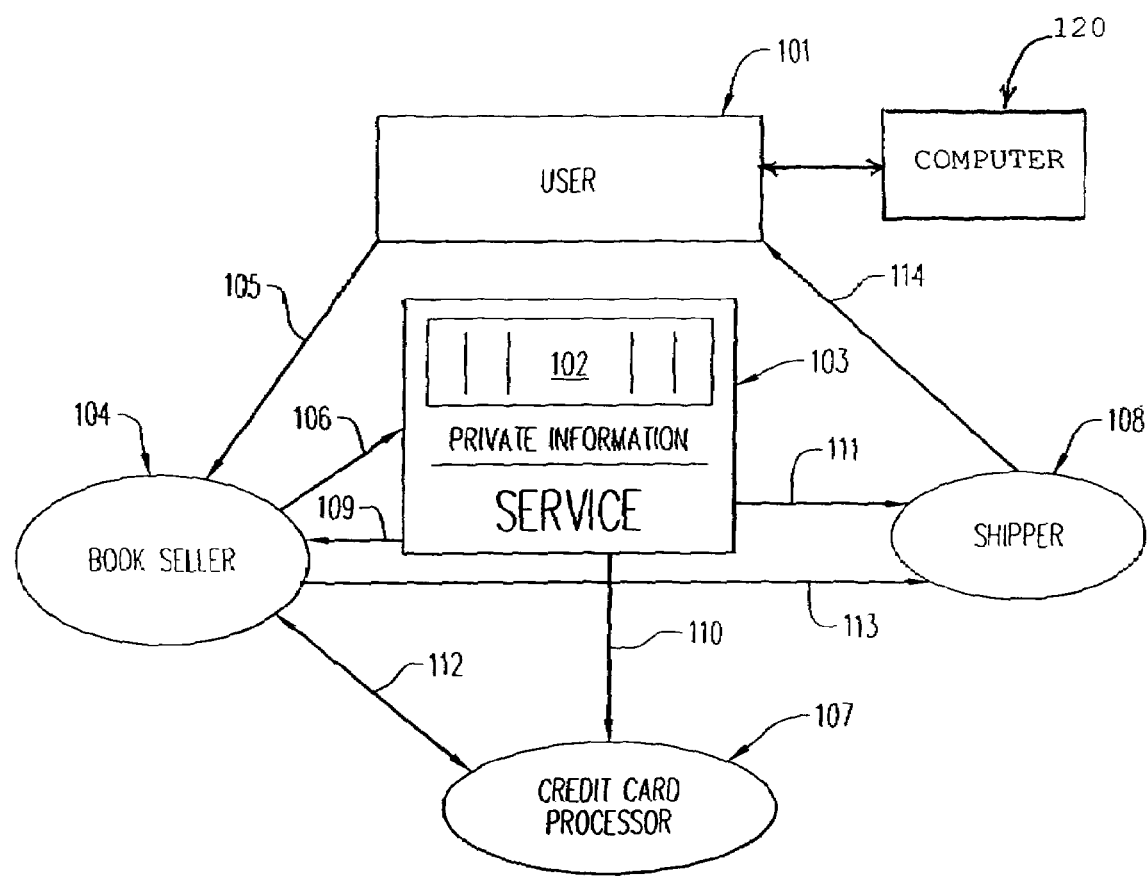
FIG. 1 is a logic diagram depicting a typical sequence of interactions between the parties to an example transaction, utilizing the method of this invention.

In FIG. 1 a user (101) has some information (102) which should be exposed to as few parties as feasible, and has contracted with a private information service (103) to assist in carrying out the method of this invention (it should be noted that in other embodiments of this invention the functions of the private information service (103) are all carried out on a computer under the user's control, rather than contracting with a separate service; in yet other embodiments some of the operations are carried out manually; other possibilities will be obvious to those skilled in the art). When the user wishes to purchase a book from an online book seller (104), he sends a message (105) to the bookseller, detailing the book to be purchased, and the electronic address of the private information service (103). The book seller (105) then sends a message (106) to the private information service (103); this message contains electronic addresses for the other parties that will be involved in the transaction: a credit-card processor (107) and a shipper (108). (The message also contains information, supplied by the user (101), to identify the user to the private information service.)

The private information service (103) then creates or otherwise selects a unique identifier for this user and this transaction, using methods known to the art, and sends messages (109,110,111) to each of the other parties to the transaction. All three messages contain a copy of the unique identifier. The message (110) to the credit-card processor also contains the credit-card number of the user (as found in the user's private information (102)). The message (111) to the shipper also contains the shipping address of the user (also taken from (102)). The bookseller (104) then sends (112) to the credit-card processor (107) a message containing the unique identifier received in message (109) and the amount of the book-purchase; the credit-card processor looks up the credit-card number corresponding to the unique identifier (as received in message (110)), conducts a routine credit transaction, and sends an acknowledgment (112) to the book seller. The bookseller then packages up the book to be shipped, and sends a message (113) to the shipper (108), containing the unique identifier as received in message (109) and information sufficient to find the package to be shipped. The shipper (108) obtains the package, and looks up the shipping address corresponding to the unique identifier (as received in message (111)). The shipper then ships the book (114) to the user (101).

Figure 2:
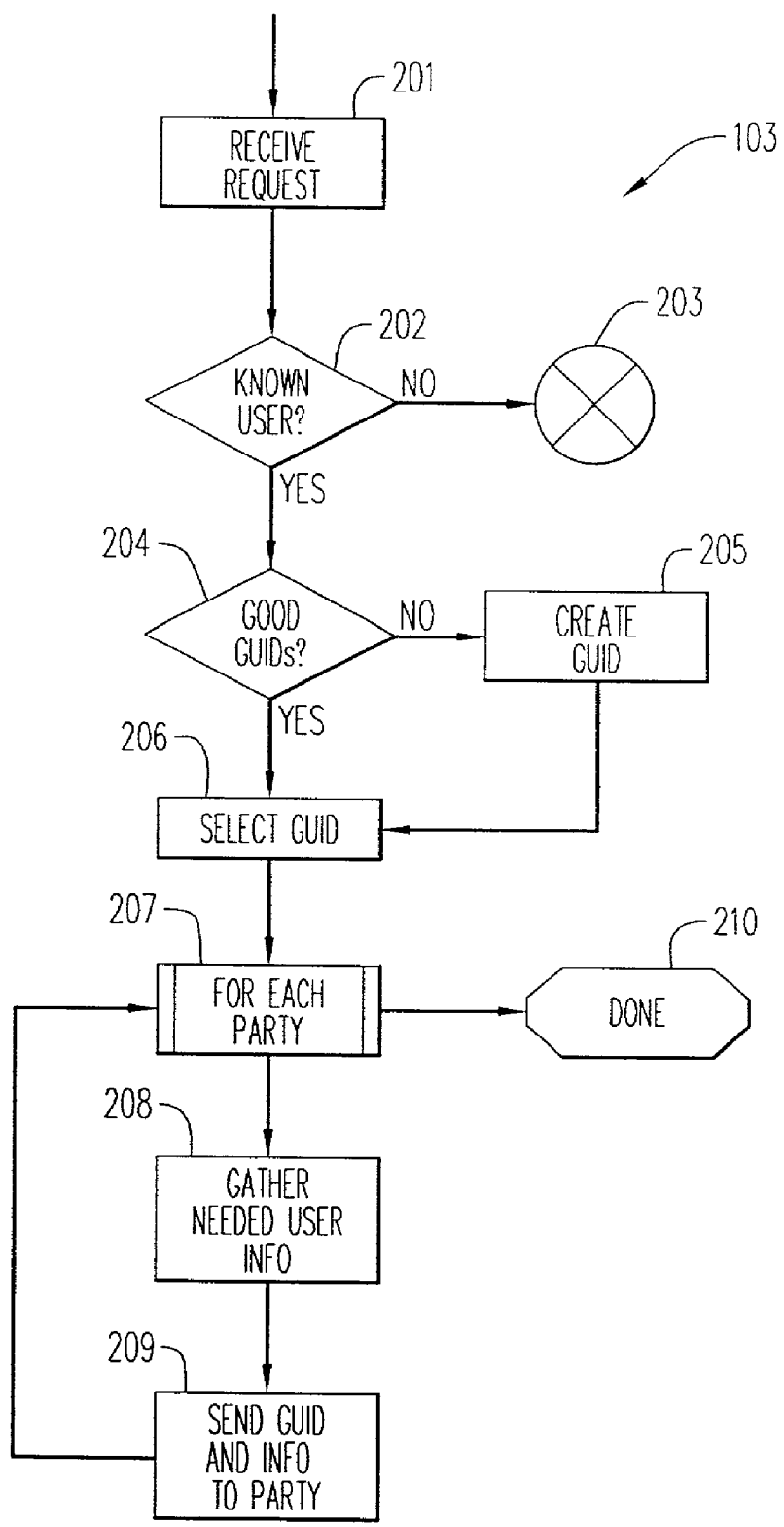
FIG. 2 is a simplified logical block diagram of the function of a private information service 103, seen in FIG. 1.

FIG. 2 illustrates by way of example simplified logic diagrams of the information flows in a presently preferred embodiment of the private information service (103). When the private information service (103) receives (201) a request (106), it first checks (202) to determine if the user identity information in the request picks out a user that is known to the service; if not (203) the service returns an error indication and is done with the request. If the user is known to the service, a determination is made (204) as to whether or not the service has any unique identifiers (hereinafter "GUIDs") corresponding to this user that are still available for use (in a presently preferred embodiment of this invention, GUIDs would have a finite lifetime, and be used for a certain period of time after being generated; in other embodiments, a fresh GUID would be generated for each new transaction, or each GUID might be valid for a certain number of transactions; other embodiments in accordance with the teachings of this invention are also possible, as will be clear to those skilled in the art). If no valid GUIDs are available, a new one is created (205) (in other embodiments of this invention, a plurality of GUIDs might be generated at this time). In any case, now that there is at least one valid GUID available, one is selected (206), and the service executes a loop (207). For each party to the transaction (as named in the received message (106)), the service determines (208) what subset of the user's private information (102) is needed by that party, and sends (209) a copy of that information, as well as the GUID selected in (206) to the party. When the appropriate message has been sent to each party, the processing of the request is complete (210).

Figure 3:
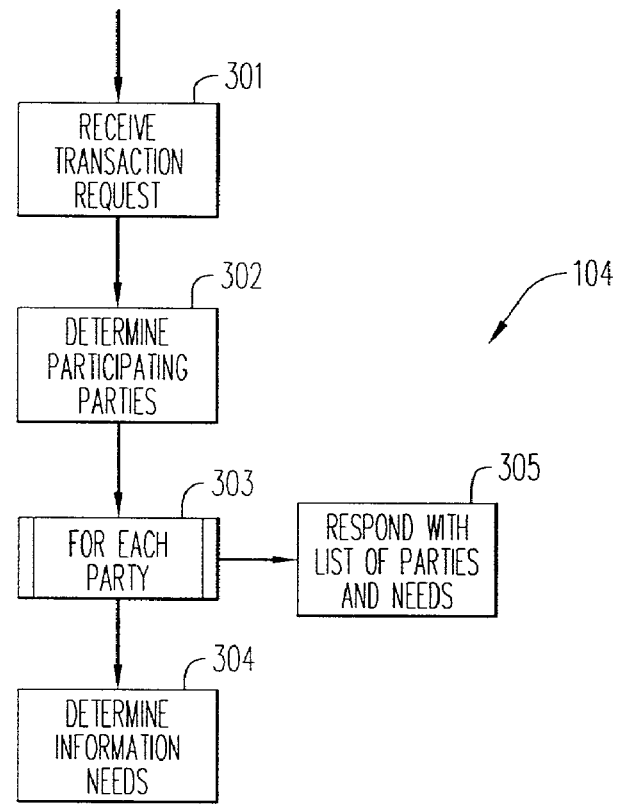
FIG. 3 is a simplified logical block diagram of the function of one party such as a participating seller in a sample transaction.
Figure 3:
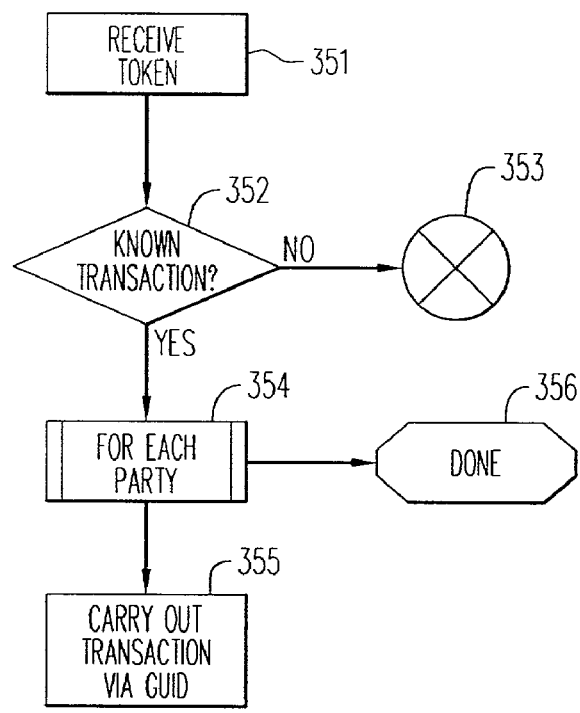

FIG. 3 illustrates by way of example simplified logic diagrams of typical information flows in a presently preferred embodiment of an online vendor such as the book seller (104). When the book seller (104) receives (301) a message (105), as seen in FIG. 1, to initiate a transaction under the methods of this invention, a determination is made (302) as to what other parties will take part in the transaction. For each (303) party in the transaction, a further determination is made (304) of what information about the user that party will need to know to play its role in the transaction. When all these determinations have been made, the list of parties and required information is sent (305) to the private information service (103), as seen in FIG. 1, named in the original request (in another embodiment of this invention, the response would be made back to the user, and the user would either perform the private information service functions itself, or forward the request onward to a contracted service; other embodiments are also possible; additionally, in other embodiments of this invention, the book seller (104) would send an indication of the role that each party will play in the transaction, rather than directly specifying what information will be needed; other embodiments are also possible). When a request (109) is received (351) from the private information service specifying a token (GUID) to be used for a specific transaction, the seller (104) checks (352) to ensure that the transaction is known; if not, processing ends (353) with an error. If the transaction is known, then for each (354) party to the transaction with which the seller needs to communicate, it does so (355) using the supplied GUID to identify the user without compromising unnecessary private information. When all necessary communications have been carried out, processing of this request is complete (356).

The use in this example of a particular number of parties with particular functions (book selling, shipping, etc) is for illustration only; it should be appreciated that this invention applies equally to any plurality of parties, in a wide variety of roles and transactions.

The invention having been thus described with particular reference to the preferred forms thereof, it will be obvious that various changes and modifications may be made therein without departing from the spirit and scope of the invention as defined in the appended claims.

What is claimed is:

1. A method for carrying out a multi-party transaction between at least a first party, a second party and a third party in which at least said third party has private information, the method comprising:

using at least one computer to perform the steps comprising:

determining a first role and a second role which said first and second parties, respectively, will take in the transaction;

determining what information about said third party is needed for said first role, and what information about said third party is needed for said second role in order to complete the corresponding role of the transaction;

selecting one or more unique identifiers selected from the group consisting of nonces, GUIDs, or other tokens, either before or after either of the determining steps, to represent said third party in the course of the transaction without exposing any of said private information to any of said first or second party beyond what is required to fulfill that party's role in the transaction;

providing said first party and said second party with a first subset and a second subset of said private information, respectively, and at least one of said selected unique identifiers, wherein said first and second subsets are based on said information needed for said first and second roles, respectively, and differ from one another at least in part; and an execution step, in which said first and second parties to the transaction complete the transaction, using the first and second subsets of the private information, respectively, without exposure thereof to one another, and said selected unique identifiers, to determine and communicate the details of the fulfillment of their respective roles while minimizing the amount of unneeded private information that is transmitted or otherwise exposed.

2. The method as in claim 1, wherein the first and second recited determining steps comprise a first phase and a second phase, respectively.

3. The method as in claim 1, wherein one or more of said selected unique identifiers are generated anew for each transaction processed, so that said selected unique identifiers uniquely corresponds to a single transaction.

4. The method as in claim 1, wherein one or more of said selected unique identifiers is generated periodically, or based on user request or some other event, and remains available to be selected and used for a period of time after being generated; so that said one or more of said selected unique identifiers does not necessarily correspond to exactly one transaction.

5. The method as in claim 1, in which one or more of said selected unique identifiers are additionally tagged (either through information directly contained in said one or more of said selected unique identifiers, or through a correspondence represented elsewhere in the networks or systems involved) with one or more pieces of meta-information, specifying how said one or more of said selected unique identifiers should be used.

6. The method as in claim 5, in which the one or more pieces of meta information comprises an expiration date, after which said one or more of said selected unique identifiers may no longer be used.

7. The method as claim 5, in which the one or more pieces of meta information comprises a usage count, specifying how many times said one or more of said selected unique identifiers may be used.

8. The method as in claim 7, in which the value of the usage count is one, so that each party using said one or more of the unique identifiers discards that unique identifier immediately upon, or shortly after, using it.

9. The method as in claim 1, in which one or more of said selected unique identifiers are generated by a program executed at the invocation of the user with a computer that may be different than said at least one computer, using algorithms known to the art to make it very unlikely that any other user would ever generate any of the same unique identifiers.

10. The method as in claim 1, in which the first-recited determining step comprises a seller phase in which it is determined which parties some party besides the user desires to take part in the transaction, and a user phase (which may take place on a different computer than the seller phase) in which it is determined which parties, if any, the user wishes to add to the transaction.

11. The method as in claim 1, in which one or more of the parties involved in the transaction may be a token-mapping party, the token-mapping party carrying out the steps of:

receiving or otherwise obtaining from the user one or more mapping requests, each specifying an input token and a corresponding output token;

obtaining from another party to the transaction, information comprising an input token, a recipient identity, and a data packet;

substituting for the input token a corresponding output token as determined by one or more of the mapping requests received from the user; and providing the resulting output token and data packet to the recipient corresponding to the recipient identity.

12. The method as in claim 1, in which at least one of the first and second parties is not sent the information directly, but is instead sent at least one of said selected unique identifiers that can be used to obtain the information without revealing its identity to said private information service.

13. The method as in claim 1, in which the first and second parties to the transaction are actually sub-parts of a single business or other entity, and one effect of the method is to divide up the private information stored by that entity into separate pieces linked only by one or more of said selected unique identifiers, so as to reduce the probability that the information will be exposed due to malice, error, or other cause.

14. The computer-readable medium as in claim 1, wherein said first party is a seller and said user is a buyer.

15. The computer-readable medium as in claim 14, wherein said second party is either a credit processor or a deliverer of that which the user is buying.

16. The computer-readable medium as in claim 1, wherein said private information service is performed at least in part by a trusted third party or by said user.

17. The computer-readable medium as in claim 1, further comprising:

said user contacting said first party with a request to purchase an item as part of said transaction;

said first party contacting a third party and identifying said user and said first and second party parties and said first and second roles; and said third party having access to said private information and performing at least part of said private information service.

18. A method of doing business on the Internet, comprising the execution of a method for a fee or other consideration, said method comprising:

carrying out with at least one computer multi-party transactions among at least a first party, a second party and a user, said user having information which he considers private, said method comprising the steps of:

determining a first role and a second role which said first and second parties, respectively, will take in the transaction;

determining what information about the user is needed for said first role and what information about said user is needed for said second roles in order to complete the corresponding role of the transaction;

using a private information service to:

select one or more unigue identifiers from the group consisting of: nonces, GUIDs, or other tokens, either before or after either of the determining steps, to represent at least the user in the course of the transaction without exposing any of said private information to any of said first party or said second party beyond what is required to fulfill that party's role in the transaction, and provide said first party and said second party with a first subset and a second subset of said private information, respectively, and at least one of said selected unique identifiers, wherein said first and second subsets are based on said information needed for said first and second roles, respectively, and differ from one another at least in part; and an execution step, in which the first and second parties to the transaction complete the transaction, using the first and second subsets of the private information, respectively, without exposure thereof to one another, and said selected unique identifiers, to determine and communicate the details of the fulfillment of their respective roles while minimizing the amount of unneeded private information that is transmitted or otherwise exposed;

wherein one or more of the parties involved in the transaction may be a token-mapping party, the token-mapping party carrying out the steps of:

receiving or otherwise obtaining from the user one or more mapping requests, each specifying an input token and a corresponding output token;

obtaining from another party to the transaction, information comprising an input token, a recipient identity, and a data packet;

substituting for the input token a corresponding output token as determined by one or more of the mapping requests received from the user; and providing the resulting output token and data packet to the recipient corresponding to the recipient identity.

19. A computer-readable medium on which computer program instructions are stored and, when read, cause one or more computers to execute a method for carrying out multi-party transactions among at least a first party, a second party and user, said user having information which he considers private, said computer-readable medium comprising:

at least a first one of said program instructions that causes said one or more computers to determine a first role and a second role which said first and second parties, respectively, will take in the transaction;

at least a second one of said program instructions that causes said one or more computers to determine what information about the user is needed for said first role and what information about said user is needed for said second roles in order to complete the corresponding role of the transaction;

at least a third one of said program instructions that causes a private information service to use at least one of said one or more computers to select, before or after the first and second program instructions, one or more unique identifiers from the group consisting of: nonces, GUIDs, or other tokens, to represent at least the user in the course of the transaction without exposing said private information to any said first party or said second party beyond what is required to fulfill that party's role in the transaction;

at least a fourth one of said program instructions that causes said private information service to use at least one of said one or more computers to provide to the first and second parties a first and a second subset of said private information, respectively, and one or more of said selected unique identifiers, wherein said first and second subsets are based on said information needed for said first and second roles, respectively, and differ from one another at least in part; and at least a fifth one of said program instructions that causes said one or more computers to complete the transaction, using the first and second subsets of private information, respectively, without exposure thereof to one another, and said selected unique identifiers to determine and communicate the details of the fulfillment of their respective roles while minimizing the amount of unneeded private information that is transmitted or otherwise exposed.

20. The method as in claim 1, wherein said transaction involves said third party purchasing an item from said first party.

21. The method as in claim 20, wherein said second party is either a credit processor or a supplier of said item.

22. The method as in claim 1, further comprising:

said third party contacting said first party with a request to purchase an item as part of said transaction;

said first party contacting a fourth party and identifying said second and third parties and said first and second roles; and said fourth party having access to said private information and performing at least said selecting step and said providing step.

23. The method as in claim 1, further comprising:

said third party contacting said first party with a request to purchase an item as part of said transaction;

said first party sending a message that identifies said second and third parties and said first and second roles; and said third party performing at least said selecting step and said providing step.

* * * * *